United States Patent [19]

Parker et al.

[11] 4,191,709
[45] Mar. 4, 1980

[54] MANUFACTURE OF AMINES FROM ALCOHOLS WITH ZEOLITE FU-1 CATALYSTS

[75] Inventors: David G. Parker; Alan J. Tompsett, both of Middlesbrough, England

[73] Assignee: Imperial Chemical Industries Limited, London, England

[21] Appl. No.: 7,612

[22] Filed: Jan. 29, 1979

[30] Foreign Application Priority Data

Feb. 6, 1978 [GB] United Kingdom ................ 4655/78

[51] Int. Cl.$^2$ .............................................. C07C 85/06
[52] U.S. Cl. ............................ 260/583 R; 252/455 Z; 260/448 C; 260/585 B; 260/583 J; 423/328
[58] Field of Search ............ 260/585 B, 583 R, 583 J, 260/448 C; 423/328-330; 252/431 N, 455 Z

[56] References Cited

U.S. PATENT DOCUMENTS

| 3,384,667 | 5/1968 | Hamilton | 260/585 B |
| 3,849,463 | 11/1974 | Dwyer et al. | 260/448 C |
| 4,021,447 | 5/1977 | Rubin et al. | 423/328 X |
| 4,060,590 | 11/1977 | Whittam et al. | 423/328 |
| 4,082,805 | 4/1978 | Kaeding | 260/585 B |

FOREIGN PATENT DOCUMENTS 1117568 6/1968 United Kingdom ..................... 423/328

OTHER PUBLICATIONS

Aiello et al., "J. Chem. Soc. (A)", pp. 1470-1475 (1970).

Primary Examiner—John Doll
Attorney, Agent, or Firm—Cushman, Darby & Cushman

[57] ABSTRACT

A process for the manufacture of an amine by reacting an alcohol, for example methanol, with ammonia at an elevated temperature in the presence of the hydrogen form of zeolite FU-1 or zeolite FU-1 in which some or all of the protons have been replaced by bivalent or trivalent cations.

9 Claims, No Drawings

MANUFACTURE OF AMINES FROM ALCOHOLS WITH ZEOLITE FU-1 CATALYSTS

The present invention relates to the manufacture of amines, in particular to the manufacture of the lower alkylamines.

The standard method of manufacturing the lower alkylamines such as the three methylamines is by the reaction of ammonia with the corresponding alcohol, e.g. methanol. The reaction is usually carried out in the vapour phase over a catalyst at a temperature in the range 300° to 500° C. and at a pressure in the range 10 to 30 ats. The catalyst which is most frequently used, especially for the manufacture of methylamines is a dehydration catalyst, e.g. an oxide such as thoria, alumina, zirconia or silica. It has also been suggested that a dehydrated crystalline alumino silicate may be used and the catalyst which is used in the process according to the present invention belongs to this group.

According to the invention a process for the manufacture of an amine comprises reacting an alcohol with ammonia at an elevated temperature in the presence of either the hydrogen form of zeolite FU-1 or zeolite FU-1 in which some or all of the protons have been replaced by bivalent or trivalent cations, e.g. by $Ca^{++}$ or by $Lu^{+++}$ or by $Ce^{+++}$.

Zeolite FU-1 is a silica-containing material which has the chemical composition, 0.6 to 1.4 $R_2O$: $Al_2O_3$: over 5 $SiO_2$: 0 to 40 $H_2O$
where R is a monovalent cation or $1/n$ of a cation of valency n and $H_2O$ is water of hydration additional to water notionally present when R is H. Zeolite FU-1 has an X-ray diffraction pattern substantially as follows:

TABLE 1

| d(A) | 100 I/Io | d(A) | 100 I/Io |
|------|----------|------|----------|
| 9.51 | 31 | 4.48 | 6 |
| 8.35 | 8 | 4.35 | 13 |
| 6.92 | 28 | 4.07 | 19 |
| 6.61 | 9 | 4.00 | 9.4 |
| 6.26 | 9 | 3.89 | 13 |
| 5.25 | 16 | 3.73 | 28 |
| 4.61 | 63 | 3.68 | 3 |
|      |    | 3.44 | 100 |

These lines were measured on the sodium/tetramethylammonium form of zeolite FU-1 but the pattern of the hydrogen form differs negligibly from the above pattern. A more detailed X-ray diffraction pattern of zeolite FU-1 is to be found in our copending cognate UK patent application No. 46130/76 and 28267/77 which also contains a description of a method used for making the zeolite and its hydrogen form.

For use in the process according to the present invention zeolite FU-1 is converted from the form in which it is hydrothermally produced, in which form it contains the oxides of alkali metal and of quaternary ammonium compound, to the hydrogen form by removal of alkali metal oxide by ion-exchange and removal of the quaternary compound, by for example calcination in air. The alkali metal oxide content of zeolite FU-1 as used in the process of the invention is preferably less than 500 ppm w/w calculated as equivalent $Na_2O$. The quaternary ammonium content of the zeolite FU-1 as used in the process of the invention is preferably less than 2% calculated w/w as elemental carbon. Preferably the hydrogen form of zeolite FU-1 is activated before use in the process by heating it to a temperature of 300° to 600° C.

The process of the invention is primarily of use for the preparation of amines from alkanols or aralkanols such as benzyl alcohol. Included in the definition "alkanol" we include cycloalkanols such as cyclohexanol, but preferably the alkanol is a lower ($C_1$ to $C_6$) alkanol in particular methanol. The amination reaction generally produces not one but a mixture of amines as one, two or three of the hydrogen atoms of the ammonia are replaced by organic groups. The type of amine which predominates can be influenced by the molar ratio of ammonia to alcohol which is used, high ratios favouring the mono-amine and low ratios favouring the triamine. In practice, the molar ratio is usually at least 0.25:1 preferably in the range 0.5:1 to 5:1, more preferably 1:1 to 3:1. One of the advantages of the process of the present invention is that the catalyst tends to favour the production of mono- and di-amine at the expense of the tri-amine an effect which is commercially beneficial as the mono- and di-amines are more readily saleable in the amounts in which they are usually produced than is the tri-amine.

The process is preferably carried out at an elevated temperature in the range 200° to 600° C. more preferably 300° to 500° C. and at a pressure preferably of 5 to 100 more preferably 10 to 30 ats. Under these conditions the process for the production of lower amines such as the methylamines will take place in the vapour phase. Preferably such a reaction is carried out continuously, the alcohol and ammonia being led over a bed of the catalyst and the amines subsequently separated by distillation from the reaction product.

The invention will now be further described with reference to the following Examples.

EXAMPLE 1

Preparation of Na-TMA-FU-1 (TMA—tetramethylammonium)

The reaction mixture had the composition: 12.64 $Na_2O.5.4(TMA)_2O.Al_2O_3.59.3$ $SiO_2.3586$ $H_2O$ Solid silica (56.5 g of KS300, batch A, 98.9% $SiO_2$, 1.1% $Na_2O$) was suspended in a mixture of 61.6 g of tetramethylammonium hydroxide (TMAOH) solution in 700 g of water. Sodium aluminate (2.8 g) and sodium hydroxide (13.5 g) were dissolved in 100 g of water and the resulting solution stirred into the silica suspension over 10 minutes. The total mixture was heated at 180° C. with reciprocatory agitation in a stainless steel 1 liter autoclave under 20 atm. pressure of nitrogen for 6 days. The solid phase was collected on a filter, washed, and then dried overnight at 120° C. giving a product of composition: 0.33 $Na_2O.1.3(TMA)_2O.Al_2O_3.22$ $SiO_2.5.5$ $H_2O$ of which about 0.6 mol of $(TMA)_2O$ may be non-structural. Its X-ray diffraction pattern had the peaks set out in the Table 1 above. The peaks are broad and typical of an ill-defined crystalline product, but the major constituent is FU-1. From the breadth of the peak at 5.25 A the mean crystalline size appeared to be about 400 A, and from the breadth at 4.61 A about 150 A.

The material was examined by electron microscopy at a magnification of 50000 and observed to be in the form of very thin, probably crumpled, sheets agglomerated into particles 0.1 to 10 microns in diameter. (Examination of FU-1 samples at higher magnification shows the crumpled sheet structure to be due to angularly interlocking platelets).

A sample of the Na-TMA-FU-1 was heated slowly to 450° C., controlling the rate of heating to avoid any temperature runaway due to burn-off of TMA, then calcined overnight at 450° C. in a stream of air saturated with water at 25° C. It was then cooled and refluxed for 5 hours with 2 ml of 5% HCl in water per g of FU-1, filtered and washed with water. The washed product was re-slurried with 60 ml of 3.65% HCl in water, stirred for 1 hour at 50° C., washed and dried. The dried product, the hydrogen form of FU-1, contained 0.3% of carbon and 300 ppm of $Na_2O$ and had an X-ray diffraction negligibly different from that of the Na-TMA-FU-1.

N.B. Washing water was demineralised. Percentages and ppm are by weight. X-ray diffraction patterns were determined by means of Cu K alpha radiation in a Philips vertical diffractometer.

The catalyst was tested using a small scale continuous laboratory unit coupled to in-line gas-liquid chromatography analysers. The catalyst in the form of chips of average size 1 to 2.8 mm was contained in a stainless steel tube 15 cm long and with an internal diameter of 6 mm. The catalyst was first activated in situ by rapidly heating it up to 380° C. then slowly (½°/minute) from 380° to reaction temperature where it was held under nitrogen for 2 hours. The alcohol used was methanol and the methanol and ammonia feed rates were chosen so as to obtain a liquid space velocity of 1.0 hr$^{-1}$. The pressure in the reactor was 20 atms and the temperature ranged from 380° C. to 420° C. The molar ratio of ammonia to methanol was varied from 0.35:1 to 2.5:1. The results are given in Table 2.

TABLE 2

| Ammonia : Methanol molar ratio | Temp. °C. | Conversion % A | B | molar % Mono A | B | molar % Di A | B | molar % Tri A | B |
|---|---|---|---|---|---|---|---|---|---|
| 0.35:1 | 380 | 82 | 28 | 9 | 18 | 16 | 24 | 75 | 58 |
| " | 400 | 92 | 39 | 10 | 10 | 18 | 16 | 72 | 74 |
| 1.5:1 | 380 | 93 | 77.8 | 32 | 42 | 26 | 27.5 | 42 | 30.5 |
| " | 400 | 97 | 94.2 | 32 | 38 | 28 | 27.5 | 40 | 37.5 |
| " | 420 | 98 | 98.4 | 34 | 37 | 27 | 27.5 | 39 | 35.5 |
| 2.5:1 | 380 | 92 | 63 | 36 | 44 | 26 | 26 | 38 | 29 |
| " | 400 | 97 | 86 | 37 | 42 | 28 | 27 | 35 | 31 |
| " | 420 | 98 | 96.5 | 39 | 41 | 28 | 28 | 33 | 31 |

A = Conventional amorphous methylamines silica-alumina catalyst
B = Catalyst prepared above

EXAMPLE 2

A second batch of catalyst was prepared in pelleted form by the same technique as that described in Example 1. It was evaluated as a methylamines synthesis catalyst by the same technique again as that described in Example 1. The results are shown in Table 3.

TABLE 3

| Ammonia: Methanol molar ratio | Temp °C. | Conversion % | Molar % Mono- | Di- | Tri- | Weight % Mono- | Di- | Tri- |
|---|---|---|---|---|---|---|---|---|
| | 380 | 91.9 | 36.1 | 26.3 | 37.6 | 24.8 | 26.2 | 49.0 |
| 2.51:1 | 400 | 97.1 | 37.2 | 27.4 | 35.4 | 25.8 | 27.5 | 46.6 |
| | 420 | 98.3 | 38.8 | 28.1 | 33.0 | 27.3 | 28.6 | 44.1 |
| | 380 | 92.9 | 32.1 | 25.4 | 42.5 | 21.4 | 24.6 | 54.0 |
| 1.54:1 | 400 | 97.1 | 32.5 | 26.6 | 40.9 | 21.8 | 26.0 | 52.2 |
| | 420 | 98.3 | 34.3 | 27.4 | 38.3 | 23.4 | 27.1 | 49.5 |
| | 380 | 82.6 | 9.7 | 16.0 | 74.3 | 5.6 | 13.3 | 81.1 |
| 0.5:1 | 400 | 91.6 | 9.7 | 18.1 | 72.2 | 5.6 | 15.2 | 79.2 |
| | 420 | 95.7 | 9.4 | 20.1 | 70.6 | 5.4 | 16.9 | 77.7 |

The results show the high activity and selectivity of the catalyst.

EXAMPLE 3

A third batch of catalyst was prepared and tested by the procedure described in Example 1. The results are presented in Table 4.

TABLE 4

| Ammonia: Methanol molar ratio | Temp °C. | Conversion % | Molar% Mono- | Di- | Tri- | Weight % Mono- | Di- | Tri- |
|---|---|---|---|---|---|---|---|---|
| | 380 | 66.4 | 44.4 | 26.3 | 29.3 | 32.2 | 27.6 | 40.3 |
| 2.49:1 | 400 | 87.5 | 42.0 | 26.9 | 31.0 | 30.0 | 27.9 | 42.1 |
| | 420 | 96.8 | 41.4 | 27.5 | 31.1 | 29.5 | 28.4 | 42.1 |
| | 380 | 78.7 | 42.1 | 27.4 | 30.4 | 30.2 | 28.4 | 41.4 |
| 1.49:1 | 400 | 93.8 | 37.8 | 27.5 | 34.7 | 26.4 | 27.7 | 45.9 |
| | 420 | 98.6 | 37.2 | 27.5 | 35.3 | 25.8 | 27.6 | 46.5 |
| 0.51:1 | 380 | 29.6 | 17.9 | 23.8 | 58.3 | 11.0 | 21.1 | 67.9 |
| | 400 | 43.8 | 8.1 | 14.8 | 77.1 | 4.6 | 12.2 | 83.2 |
| | 380 | 27.8 | 42.6 | 27.7 | 29.6 | 30.7 | 28.9 | 40.5 |
| 1.49:1 | 400 | 31.7 | 41.6 | 28.3 | 30.1 | 29.8 | 29.3 | 40.9 |

The results show the effect on selectivity of operating at low conversions.

EXAMPLE 4

The catalyst prepared in Example 2 was tested by the same technique but over a wider temperature range. The results are given in Table 5.

TABLE 5

| Ammonia: Methanol molar ratio | Temp °C. | Conversion % | Product Analysis | | | | | |
|---|---|---|---|---|---|---|---|---|
| | | | Molar % | | | Weight % | | |
| | | | Mono- | Di- | Tri- | Mono- | Di- | Tri- |
| | 320 | 37.1 | 41.7 | 22.5 | 35.8 | 29.3 | 22.9 | 47.7 |
| | 340 | 55.2 | 32.9 | 23.6 | 43.5 | 22.0 | 22.8 | 55.2 |
| | 360 | 76.1 | 28.7 | 25.5 | 45.8 | 18.8 | 24.2 | 57.0 |
| 1.49:1 | | | | | | | | |
| | 380 | 93.9 | 26.6 | 26.8 | 46.6 | 17.3 | 25.2 | 57.5 |
| | 400 | 97.4 | 27.4 | 26.3 | 46.3 | 17.9 | 24.8 | 57.3 |
| | 420 | 97.6 | 30.7 | 29.7 | 39.6 | 20.6 | 28.9 | 50.5 |

We claim:

1. A process for the manufacture of an amine which comprises reacting an alcohol with ammonia at an elevated temperature in the presence of either the hydrogen form of zeolite FU-1 or zeolite FU-1 in which some or all of the protons have been replaced by bivalent or trivalent cations.

2. A process as claimed in claim 1 in which the alkali metal oxide content of zeolite FU-1 used in the process is less than 500 ppm w/w calculated as equivalent $Na_2O$.

3. A process as claimed in claim 1 in which the quaternary ammonium content of zeolite FU-1 used in the process is less than 2% calculated w/w as elemental carbon.

4. A process as claimed in claim 1 in which the hydrogen form of zeolite FU-1 is used and in which the zeolite is activated before use by heating it to a temperature in the range of 300° to 600° C.

5. A process as claimed in claim 1 in which the form of zeolite FU-1 used has some or all of the protons replaced by calcium or rare-earth metal cations.

6. A process as claimed in claim 1 in which the alcohol is a lower ($C_1$ to $C_6$) alkanol.

7. A process as claimed in claim 1 in which the molar ratio of ammonia to alcohol is at least 0.25:1.

8. A process as claimed in claim 1 in which the process is carried out at a temperature in the range 200° to 600° C. and at a pressure in the range 5 to 100 atmospheres.

9. A process as claimed in claim 1 for the manufacture of methylamine which comprises reacting methanol and ammonia at a molar ratio of ammonia to methanol in the range 0.5:1 to 5:1, at a temperature in the range 300° to 500° C., at a pressure in the range of 10 to 30 atmospheres and in the presence of the hydrogen form of zeolite FU-1.